(12) United States Patent
Marien

(10) Patent No.: US 7,990,292 B2
(45) Date of Patent: Aug. 2, 2011

(54) METHOD FOR TRANSMISSION OF A DIGITAL MESSAGE FROM A DISPLAY TO A HANDHELD RECEIVER

(75) Inventor: Dirk Marien, Ranst (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 721 days.

(21) Appl. No.: 12/111,125

(22) Filed: Apr. 28, 2008

(65) Prior Publication Data
US 2009/0322766 A1 Dec. 31, 2009

(51) Int. Cl.
*H03M 5/16* (2006.01)
*H03M 7/12* (2006.01)

(52) U.S. Cl. ............... 341/57; 341/84; 341/90

(58) Field of Classification Search .......... 341/56, 341/57, 62, 84, 85, 90
See application file for complete search history.

(56) References Cited

U.S. PATENT DOCUMENTS
4,068,227 A * 1/1978 Graham ............ 341/57
5,892,466 A * 4/1999 Walker ............ 341/57

FOREIGN PATENT DOCUMENTS
SU  1330762 A * 8/1987

* cited by examiner

*Primary Examiner* — Howard Williams
(74) *Attorney, Agent, or Firm* — Manatt, Phelps & Phillips LLP

(57) ABSTRACT

The invention relates to a method to efficiently transmit a digital message over a unidirectional optical link, such as the link between a computer screen and a security token equipped with photosensitive elements. It is an object of this invention to provide a source coding scheme that is optimized for transmissions of alphanumerical data containing frequent occurrences of numerals and less frequent occurrences of non-numerical data. This is achieved by using a modified Huffman code for source coding, consisting of a nibble-based prefix-free binary code. The output of the coder is efficiently mapped onto a 6B4T channel code, wherein unused ternary codewords can be used to signal data-link layer events. This efficient signalling of data-link layer events, in turn, allows for a synchronization scheme based on repeated transmissions of a finite-length message, combined with an out-of-band clock signal.

33 Claims, 5 Drawing Sheets

US 7,990,292 B2

METHOD FOR TRANSMISSION OF A DIGITAL MESSAGE FROM A DISPLAY TO A HANDHELD RECEIVER

TECHNICAL FIELD

The invention relates to a method to efficiently transmit a digital message over a unidirectional optical link, such as the link between a computer screen and a security token equipped with photosensitive elements.

RELATED APPLICATION

This application is related to U.S. patent application Ser. No. 12/046,118 of Mar. 11, 2008, the entirety of which is incorporated by this reference.

BACKGROUND ART

The present invention deals with unidirectional communication over a link which includes the path from a display, typically a PC screen, to a handheld device equipped with photosensitive elements. When viewed as data communication elements, PC screens can be characterized as having a very low symbol rate (the refresh rate of the screen, typically in the order of 60 Hz) and a very large symbol space (each configuration of pixels on the screen can be considered as a single symbol, leading to a symbol space in the order of $600\times800\times24=11,520,000$ bits, or $2^{11,520,000}$ different pixel configurations). This corresponds to an uncompressed data rate of 691.2 Megabit per second. The PC screen is clearly intended for communication towards the human visual system, which registers and analyzes the impression given by the entire screen, without having to be able to follow the changes in every individual pixel.

When using the PC screen as an output device for digital communication towards an automated receiver, such as a handheld electronic device, the screen would have to be resampled at least the same resolution and refresh rate in order to reconstruct the full underlying digital information. This would require a built-in high-definition digital video camera, which is not economically feasible for receivers that have no other use for such a camera. The alternative is to use only a small portion of the PC screen as a digital transmitter, and use selected sets of pixels as individual digital communication channels. Relatively cheap photosensitive elements can then be used at the receiver side to detect the transmission from these respective digital communication channels.

The result is a system for digital communication that can be analyzed in a way that is very similar to a free-space optical link. General free-space optical links have many applications in today's highly connected world. One class of such applications uses unfocused and incoherent light, typically in the visual or infrared part of the spectrum, to provide a simple wireless digital communications medium between consumer electronic or data devices (e.g. infrared remote controls for TVs and VCRs; IRDA data links between computers and PDAs or mobile telephones). The fact that unfocused light is used, implies that the light intensity at the receiver decreases as the square of the distance from the transmitter, limiting the use of this technology to short-range applications.

PC-screen based optical communication is also known in the art, in the form of CCD barcode readers that read barcodes displayed on a PC screen. One class of devices in which PC-screen based optical communication has been introduced, is comprised of unconnected strong authentication tokens, which generate client credentials for use in client-server interactions. Strong authentication tokens electronically generate one-time passwords (OTPs) on the basis of a shared secret, an internal counter and/or a clock, and optionally a challenge provided by a server. Such a challenge may consist of a randomly generated nonce, or data derived from a transaction to be digitally "signed" by the token's owner. As these tokens are by definition not electronically connected to the client PC that is used for the client-server interaction, they must include a mechanism for entering the server challenge.

A typical mechanism to provide data to a strong authentication token is by letting the user enter the data manually on the token's keypad. This process of manual entering of data on a token's keypad is often perceived as inconvenient or cumbersome by users. To relieve the user, solutions have been devised whereby the input of data doesn't require the manual entry of data by the user on the token's keypad. One example is a token which receives data over an out-of-band channel such as for example a radio network or mobile telephony network (U.S. Pat. No. 5,668,876 Sep. 16, 1997, EP 1802155 Jun. 27, 2007). The disadvantage of such out-of-band solutions is the extra complexity and cost associated with supporting the technology of the out-of-band channel, and the dependence on the availability of the out-of-band channel.

Another solution consists of tokens that allow for data input by means of an optical interface, whereby the user holds the token close to a computer screen. Examples of such optical tokens are Digipass® 700 and Digipass® 300 offered by Vasco Data Security, and the tokens described in EP 1211841 Jun. 5, 2002, EP 1788509 May 23, 2007, U.S. Pat. No. 5,136,644 Aug. 4, 1992. This is, inter alia, a type of communication that the present invention addresses.

The refresh rate of the PC screen limits the data rate that can practically be achieved in screen-to-receiver transmissions. Even when efficient data encoding is being used, the actual transmission of the data may still take an unacceptable amount of time if the data is source-coded into bytes and is optically represented in a binary form. End users cannot be expected to hold their strong authentication tokens still in front of their computer screens for more than a few seconds.

Furthermore, transmit-receive synchronization for strong authentication tokens is radically different from the equivalent consumer electronics applications of digital free-space optical communication, such as changing TV channels with an infrared remote control. To change TV channels with an infrared remote control, the user would first point the transmitter towards the receiver and then start transmission by pushing the appropriate button, knowing that the TV set is already in a mode where it is ready to accept such transmission. In transmissions from a PC screen to a strong authentication token, the end user is responsible for positioning the receiver, but not necessarily for initiating the transfer or for ensuring that the authentication token is ready to start taking in data. It should also be noted that due to the unidirectional nature of these transmission channels, the transmitter cannot rely on a signal from the receiver to know when transmission may start.

DISCLOSURE OF INVENTION

The present invention is based on the insight that the physical transmission rate of an optical transmitter composed of a set of PC screen pixels modulated at the screen's refresh rate is inherently limited by the refresh rate and the number of pixel configurations that can be detected at the receiver, and that an improvement in data rate can only be accomplished by innovative source coding and channel coding. It is further based on the insight that where the symbol rate is limited but the marginal cost of transmitting additional symbols is low at the transmitter side, notably because the PC screen consists of a very large number of pixels which are available during a long period of time and which are capable of transmitting a very large number of different light intensity levels, redundancy can advantageously be employed to reduce the total time needed to receive a finite-length message.

It is an object of this invention to provide a source coding scheme that is optimized for transmissions of alphanumerical data containing frequent occurrences of numerals and less frequent occurrences of non-numerical data. It is therefore a first aspect of this invention to use a modified Huffman code for source coding, consisting of a nibble-based prefix-free binary code assigning single-nibble codewords to numerals and double-nibble codewords to other elements of the alphabet, thus reducing the statistically expected codeword length for messages known to consist chiefly of numerals. In addition to numerals and text characters, the alphabet may further comprise "special characters", which can be displayed at the receiver side as currency symbols, icons, error messages, user interaction messages, formatting modifiers, etc. The term "alphanumerical message" shall hereinafter be understood to include messages that contain such special characters.

It is a further object of this invention to provide an efficient ternary channel coding scheme to reduce transmission time and minimize data link layer overhead related to framing. It is therefore a second aspect of this invention to use a ternary channel coding scheme. A ternary channel coding scheme provides a 58% gain in raw data rate over binary transmission at a relatively low cost. As an additional advantage, by converting sets of six bits into four trits (6B4T coding), 21% of the ternary symbol space (or 17 codewords) remains available for in-band signalling of data-link related events such as start-of-frame and end-of-frame, or data-link related information such as frame number and frame length, without having to add transparency overhead at the binary level (notably "bit stuffing" or "byte stuffing").

It is also an object of this invention to facilitate synchronization between transmitter and receiver without introducing delays at the start of the transmission or relying on a return channel. It is therefore a third aspect of this invention to cyclically repeat the transmission of one or more messages, without interruption between subsequent transmissions.

BRIEF DESCRIPTION OF THE DRAWINGS

The foregoing and other features and advantages of the invention will be apparent from the following, more particular description of several embodiments of the invention, as illustrated in the accompanying drawings.

DETAILED DESCRIPTION OF THE INVENTION

It is an object of this invention to provide a source coding scheme that is optimized for transmissions of alphanumerical data containing frequent occurrences of numerals and less frequent occurrences of non-numerical data.

Alphanumerical messages are typically digitized by means of fixed-length binary codes such as the American Standard Code for Information Interchange (ASCII), which uses seven bits per character, or UNICODE, which uses 16 bits per character. If the statistical prevalence of each character is known for a given language, variable-length encoding schemes can be found that provide a shorter average length for the encoded message. Huffman coding is often used to provide a prefix-free binary code with minimum expected codeword length. The main problems with a Huffman-based approach is that it can only be optimized for a single set of languages with common character statistical properties, and that it produces codewords that can have any length between 1 bit and a maximum depending on the alphabet size.

In many applications, the actual language of the alphanumerical message is not known in advance, but the alphabet from which all messages are composed is known. In applications involving strong authentication tokens, the average prevalence of the elements of the set of all numerals is known to be higher than the average prevalence of the elements of the set of all letters and special characters.

In many applications, the length of the binary encoded message must be a multiple of four bits (a nibble), eight bits (a byte), sixteen bits (a word), or thirty-two bits (a doubleword), to avoid complex message boundary detection issues. Byte-aligned messages are often preferred for efficient processing on a variety of hardware platforms. Nibble-aligned messages are still relatively easily amenable to efficient processing on a variety of hardware platforms, while offering more flexibility in the composition of the source coding alphabet.

It is therefore a first aspect of this invention to use a modified Huffman code for source coding, consisting of a nibble-based prefix-free binary code assigning ordered sets of four bits (single-nibble codewords) to numerals and ordered sets of eight bits (double-nibble codewords) to other elements of the alphanumerical alphabet, thus reducing the statistically expected codeword length for messages known to consist chiefly of numerals. This mapping preserves the possibility of using the binary coded decimal (BCD) representation for numerals, which is widely used and maximizes compatibility with hardware and software for BCD-based arithmetic.

Figure 5:
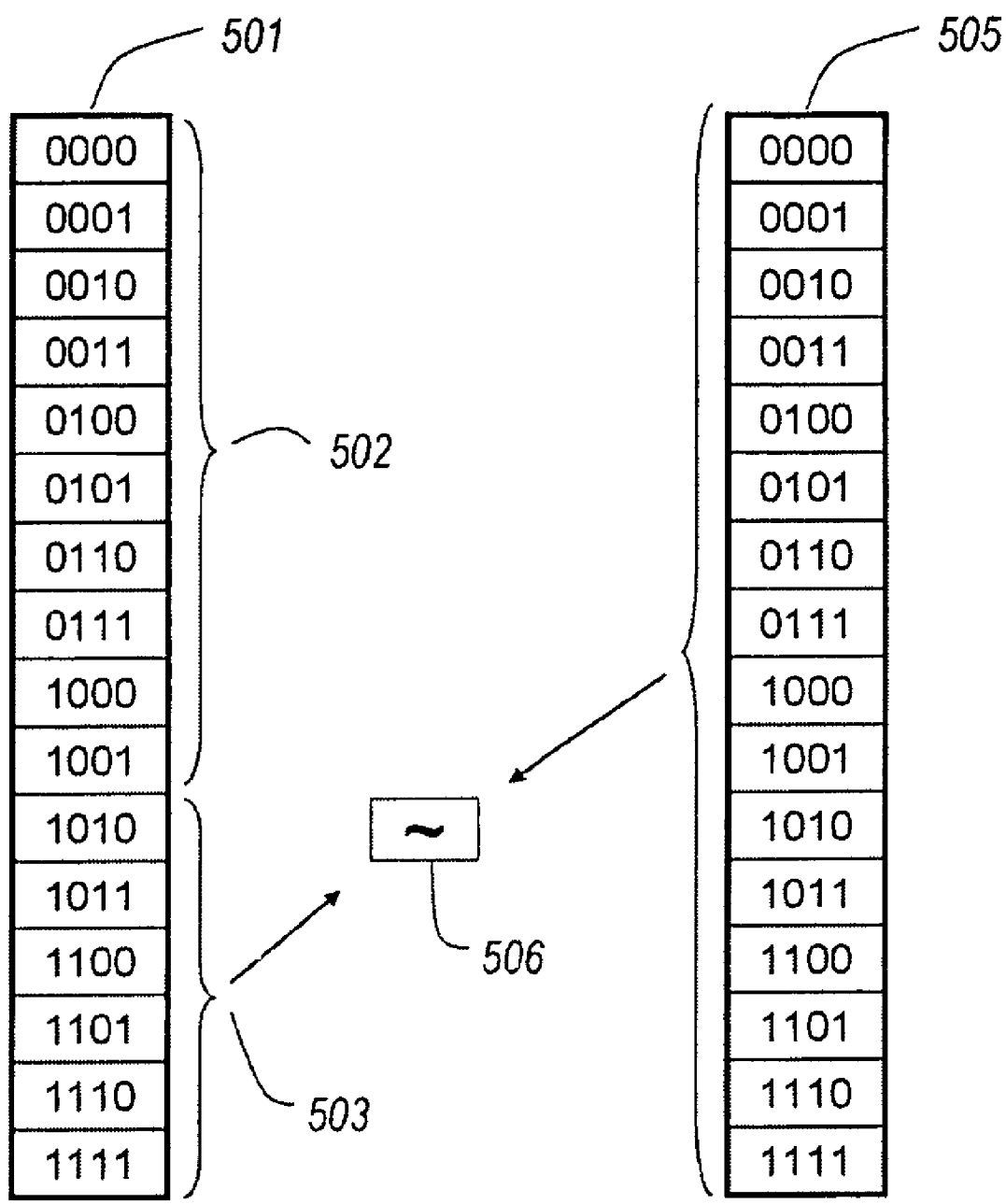
FIG. 5 and FIG. 6 schematically illustrate examples of the source coding scheme employed in the invention.

An example of the resulting source coding scheme is illustrated in FIG. 5. Every codeword begins with a nibble from the first nibble table 501. The first ten nibbles from table 501, separately identified in FIG. 5 as range 502, correspond to the binary-coded decimal (BCD) representations of the numerals 0 through 9, and are used as such without a second nibble. The following 6 nibbles from table 501, separately identified in FIG. 5 as range 503, are used in conjunction with a nibble from second nibble table 505 to form 96 byte-sized codewords, where the concatenation operation 506 is schematically indicated by a tilde sign.

It is a further object of this invention to provide an efficient ternary channel coding scheme to reduce transmission time and minimize data link layer overhead related to framing.

Optical transmission channels usually employ binary or M-ary (with $M=2^k$ pulse-amplitude modulated channel coding schemes, representing individual bits or integer sets of bits in each symbol. Multi-level channel coding schemes require more accurate power level detection at the receiver than strictly binary channel coding schemes. The gain in data rate is thus to be weighed against the additional receiver complexity and cost.

It is therefore a second aspect of this invention to use a ternary channel coding scheme. A unit of ternary information, or ternary digit, shall hereinafter be referred to as a "trit". An optimal ternary channel coding scheme provides a 58% gain in raw data rate over binary coding for a fixed symbol rate at a relatively low cost. The main degree of freedom when designing ternary channel coding schemes, is the choice of k and n, where k is the number of bits that are packed into n trits, and where k and n must satisfy $2^k \leq 3^n$. The only widely used ternary coding scheme known in the art has k=4 and n=3 (4B3T coding), which has a theoretical transmission efficiency of 4 log 2/3 log 3=84%. The reason for choosing 4B3T is that it offers $(3^3-2^4)/3^3=41\%$ codespace redundancy, such that certain sets of 4 bits can be represented by two different sets of 3 trits, the alternation of which is used for spectral shaping. In the present invention, we want to optimize the channel coding scheme for an optical environment where bandwidth shaping and interference are not a concern, so we can advantageously move away from the codes that are considered optimal in the prior art. By selecting a channel coding scheme with k=6 and n=4 (6B4T coding), we obtain a data transmission efficiency of 6 log 2/4 log 3=95%, while the codespace redundancy of $3^4-2^6/3^4=21\%$ leaves an ample 17 codewords available for in-band signalling of data-link related events such as start-of-frame and end-of-frame, or data-link related information such as frame number and frame length, without having to add transparency overhead at the binary level (notably "bit stuffing" or "byte stuffing").

Figure 7:
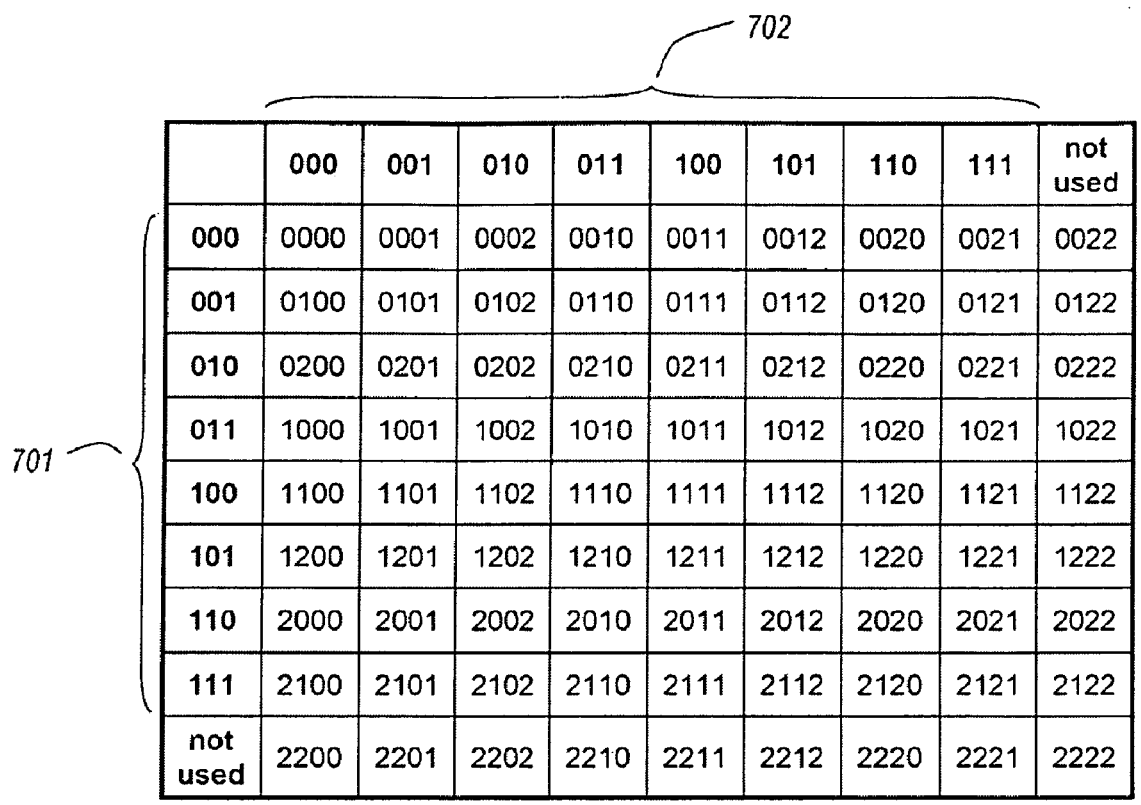
FIG. 7 illustrates an example of the channel coding scheme employed in the invention.

An example of the resulting channel coding scheme is illustrated in FIG. 7. For any ordered set of 6 bits, the corresponding channel codeword can be found by looking up the first 3 bits in column 701 and looking up the last 3 bits in row 702, after which the channel codeword is read out in the table cell at the intersection of the identified row and column. The 17 ternary codewords in the rightmost row and the bottom column do not correspond to any ordered set of 6 bits, and thus remain available for other use.

It is a necessary consequence of the 6B4T coding scheme that the input to the coding stage must consist of an integer multiple of 6 bits. As the preceding source coding stage generates nibbles and bytes, the source-coded message length will always be a multiple of 4 bits. In order to get to the next multiple of 6 bits, either 2+6p or 4+6p padding bits are required, where p is an arbitrary integer. In general, adequate padding can be accomplished by adding 2 bits (2+6p=2, iff p=0) or 4 bits (4+6p=4, iff p=0). If padding by an integer number of nibbles is desired, it can be shown that this can always be accomplished by a single nibble (4+6p=4, iff p=0) or two nibbles (2+6p=8, iff p=1), implying that the maximum number of required padding bits would be eight.

If the length of the actual message is implicitly or explicitly known to the receiver, or if it is known to be a multiple of a certain basic length, the content of the padding bits is irrelevant. In a more general case, the receiver does not know the length of the actual message, and therefore it needs a way to distinguish the message from the padding. It is a combined technical effect of the first aspect of this invention (prefix-free binary code) and the second aspect of this invention (ternary channel coding), that an additional unused nibble-sized source codeword may be defined for use as channel coding padding, without introducing data/padding ambiguity. As this nibble may not reappear as a prefix for a byte-sized codeword, this approach in fact sacrifices 16 byte-sized codewords (viz., the combinations of the padding nibble with the 16 possible values of the second nibble), reducing the available byte-sized codeword space to a still very ample size of 80.

Figure 6:
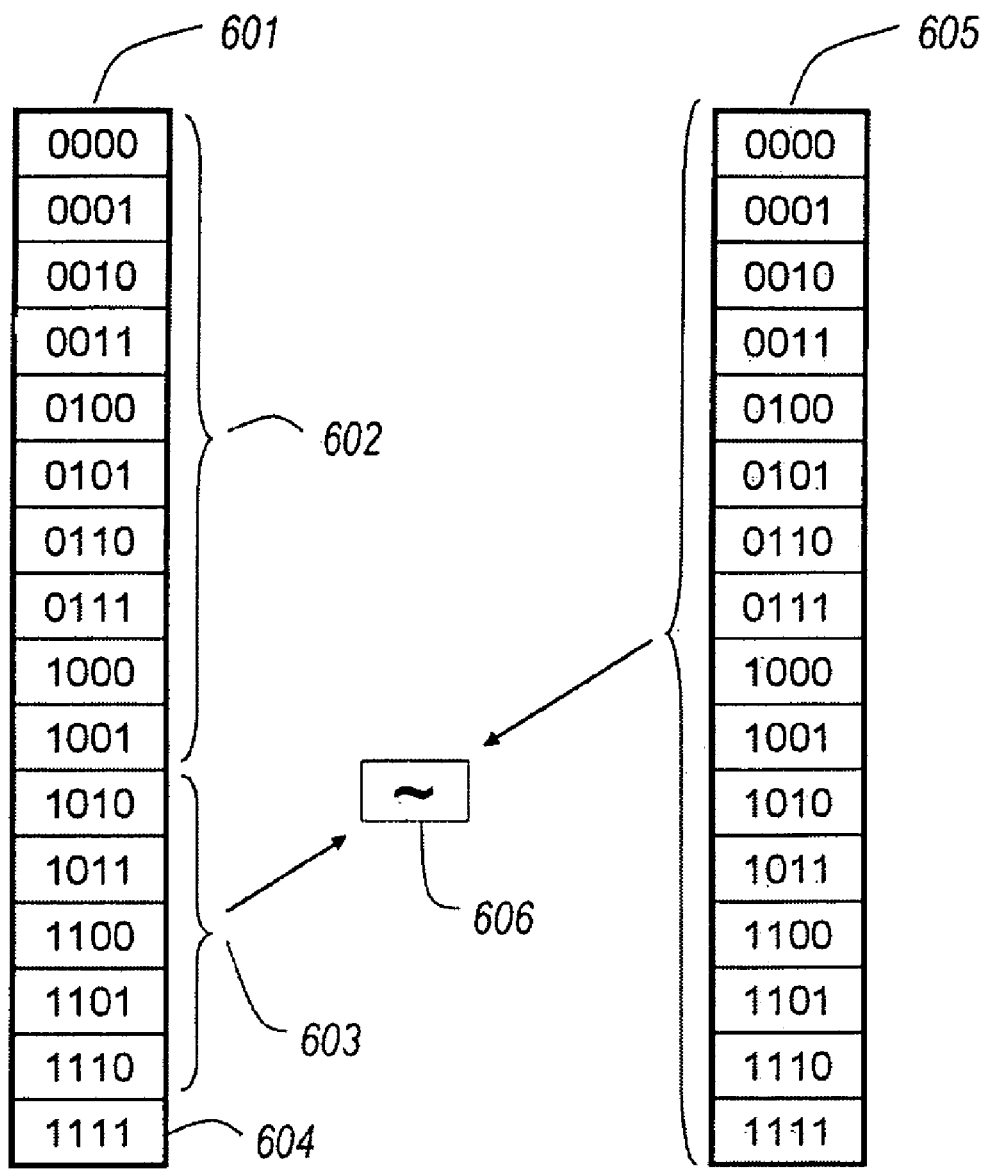

An example of the resulting source coding scheme is illustrated in FIG. 6. Every codeword begins with a nibble from the first nibble table 601. The first ten nibbles from table 601, separately identified in FIG. 6 as range 602, correspond to the binary-coded decimal (BCD) representations of the numerals 0 through 9, and are used as such without a second nibble. The following 5 nibbles from table 601, separately identified in FIG. 6 as range 603, are used in conjunction with a nibble from second nibble table 605 to form 80 byte-sized codewords, where the concatenation operation 606 is schematically indicated by a tilde sign. The final nibble from table 601, separately identified in FIG. 6 as nibble 604, corresponds to the padding sequence, and is used as such without a second nibble, appearing once or twice according to the length of the message to be encoded.

If there is an intermediate processing stage between the output of the source coding stage and the input of the 6B4T channel coding stage, such as a scrambler or an encryption engine, it will not generally be possible to exploit the unused source codewords to form unambiguous padding words for use in the channel coding stage, as these will not be preserved across the processing stage. This does not preclude the use of dedicated source codewords as padding codewords to provide any form of padding that the intermediate processing stage might require. In the presence of such an intermediate processing stage, we can still meet the padding requirements of the channel coding stage by adding either 2 or 4 padding bits in the channel coding stage itself. An addition of 2 arbitrary padding bits can be unambiguously detected by a receiver because the receiver would expect only nibble-aligned or byte-aligned content, and would therefore realize that any remaining 2 bits beyond the last complete data nibble boundary can only result from padding. An addition of 4 padding bits can be advantageously signalled in the channel coding stage: sets of 6 bits consisting of the last 2 data bits of a source-coded and processed message and 4 padding bits, may be encoded into some of the unused ternary codewords (e.g., the channel codewords of the right-most column and the bottom row of the scheme illustrated in FIG. 7). As there are only 4 possible combinations of 2 data bits, and as the padding bits need not be reconstructed at the receiving end, only 4 different ternary codewords need to be allocated to support this coding scheme.

It is also an object of this invention to facilitate synchronization between transmitter and receiver without introducing delays at the start of the transmission or relying on a return channel.

For non-permanent channels, transmit-receive synchronization is usually obtained as part of the link set-up protocol or handshake. For unidirectional channels, a true "handshake" is not possible due to the absence of a return channel from the receiver to the transmitter. The transmitter could delay the start of the transmission for a certain length of time, hereinafter referred to as the "initial delay", in order to give the user ample opportunity to bring the receiver in the required state and position to receive the transmission. To avoid frequent misses of the start of transmission, the initial delay would have to be relatively long, causing a long wait in most cases. Furthermore, the transmission should be preceded with a symbol clock synchronization signal (hereinafter the "preamble"), which adds another delay.

The synchronization method above may be improved by filling up the initial delay with repeated transmissions of the exact same message. This improvement exploits the fact that the message has finite length. It gives the receiver the opportunity to lock onto the message at the first occurrence of the preamble after its being adequately positioned to receive transmissions, thus avoiding having a ready receiver waiting for a prolonged period of time. Here, the technical effect of the second aspect of the invention (ternary channel coding) can be used advantageously to form the preamble out of unused ternary codewords, without the need to introduce any transparency overhead.

The message may be transmitted a predetermined number of times, or until a certain terminal condition is satisfied. In the case of a security token receiving a challenge from the PC screen, the terminal condition may for instance be the user's entering of the token's response via the PC's keyboard.

The synchronization method above may be further improved by removing the preamble, and transmitting an out-of-band symbol clock synchronization channel instead. This requires an additional photosensitive element in the receiver. It allows the receiver to lock onto the symbol clock while waiting for the next start of the message, thus further reducing the amount of waiting time.

A final improvement of the above synchronization method consists of breaking up the message in smaller frames allowing the receiver to lock onto the message at the first start of a frame occurring after its being adequately positioned to receive transmissions, thus even further reducing the amount of waiting time. This improvement allows individual frames to be acted upon individually at the receiver side, or to be buffered and recombined into a meaningful message. The start of each frame may be signalled by means of an in-band frame delimiter, or by means of the out-of-band symbol clock synchronization channel, if present. In the remainder of this application, we will disclose embodiments of the invention that divide messages into one or more frames, thus indicating that the same inventive concept applies whether or not the message includes a plurality frames.

Again, the technical effect of the second aspect of the invention (ternary channel coding) is that unused ternary codewords can be used to form a frame delimiter, without the need to introduce any transparency overhead.

For the receiver to correctly reconstruct a message that has been broken up into smaller frames, it needs to know the number of frames the message consists of. This can be achieved by adding a sequence number to each frame. If the maximum number of frames is sufficiently small, it is advantageous to use a set of unassigned ternary codewords to delimit frames, whereby each different delimiting codeword implicitly represents a different sequence number.

In a limiting case, a frame consists of a single transmitted symbol, and the receiver is able to lock onto any given individual symbol in the cyclic transmission and keep buffering the received symbols until the received message is complete. This is possible when the receiver has prior knowledge of the message length.

It is therefore a third aspect of this invention to cyclically repeat the transmission of one or more messages, without interruption between subsequent transmissions.

While the different aspects of this invention present individual improvements over the prior art, the combination of these aspects has the benefit of providing the most efficient solution for rapid reception of optically transmitted digital data in a handheld receiver, such as a strong authentication token, by exploiting judiciously added redundancy in the channel coding stage (introduced by mapping codewords from the binary source codespace to codewords that form a subset of the ternary channel codespace) and judiciously added redundancy in the time domain (introduced by cyclically transmitting messages). While the person skilled in the art would expect that such an addition of redundancy outside the context of forward error correction would increase the total transmission cost and time, our invention exploits the fact that the marginal cost of symbol transmission in screen-to-receiver communications is close to zero at the transmitter side, notably because the PC screen consists of a very large number of pixels which are available during a long period of time and which are capable of transmitting a very large number of different light intensity levels, to advantageously reduce the time required to fully receive a complete finite-length message.

MODE(S) FOR CARRYING OUT THE INVENTION

The embodiments of the invention disclosed in the following paragraphs include methods, computer programs recorded on a machine readable medium, and receiving apparatus.

In general, the method according to this invention to transmit an alphanumerical message from a display screen for reception at a receiver, comprises the steps of converting the message into a bit sequence, using a prefix-free binary mapping wherein each numeral is represented by a nibble and each other character is represented by a pair of nibbles; dividing said bit sequence into one or more frames, each of which is extended with padding bits so as to have a total number of bits that is a multiple of six; converting each of said frames into a trit sequence, using a mapping whereby ordered sets of six bits are represented by ordered sets of four trits; and converting each of said trit sequences into an image sequence that, when displayed, represents said trit sequence as a plurality of pixel sets modulated to at least three distinct output levels.

In one embodiment of the present invention, said trit sequences are concatenated and a message delimiter is added prior to said conversion of said trit sequence into said image sequence, said message delimiter comprising sets of four trits, distinct from the sets of four trits used to represent data. In a particular embodiment of the present invention, the message delimiter is a sequence with optical properties that facilitate clock recovery, such as for example a sequence comprising an alternation of four trits that each have a value that, when transmitted, is represented by maximum luminance of the relevant pixel set, and four trits that each have a value that, when transmitted, is represented by minimum luminance of the relevant pixel set. In another embodiment of the present invention, the message delimiter is a single set of four trits.

In one embodiment of the present invention, an additional optical channel, consisting of a selected set of pixels from the display screen, is used to signal the symbol rate.

In one embodiment, said bit sequence is encrypted.

In one embodiment of the present invention, said trit sequence is transmitted cyclically without interruption between subsequent transmissions.

In one embodiment of the present invention, cyclic redundancy check information is added to said frames. In another particular embodiment, said frames are delimited by a frame delimiter consisting of one or more sets of four trits, distinct from the sets of four trits used to represent data. In a further set of embodiments of the present invention, the trit sequence is further divided into segments, delimited by segment delimiters comprising one or more ordered sets of four trits, distinct from said ordered sets of four trits used to represent ordered sets of six bits.

In one embodiment of the present invention, the prefix-free binary mapping maps every numeral onto its binary coded decimal (BCD) equivalent, while mapping all other characters of interest onto some or all of the 96 8-bit combinations that do not have a valid BCD-value as their first nibble. In another embodiment of the present invention, the prefix-free binary mapping maps every numeral onto its binary coded decimal (BCD) equivalent and reserves one nibble for use as a padding sequence, while mapping all other characters of interest onto some or all of 80 8-bit combinations that do not have a valid BCD-value or the padding sequence as their first nibble.

Figure 1:
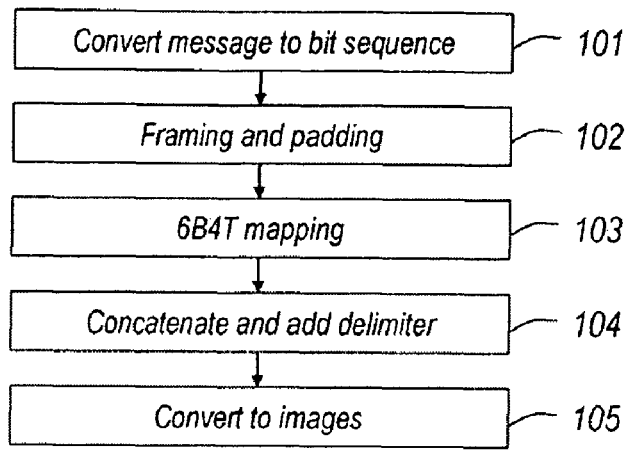
FIG. 1 illustrates a method to convert an alphanumerical message into an image sequence for transmission from a screen for subsequent reception at a receiver.

FIG. 1 illustrates a method to convert an alphanumerical message into an image sequence for transmission from a screen for subsequent reception at a receiver comprising the steps of converting said alphanumerical message into a first bit sequence 101; dividing said first bit sequence into one or more frames and adding up to 8 padding bits to each of said frames 102; converting each of said frames into a trit sequence, using a 6B4T mapping 103; optionally concatenating and adding a message delimiter to said trit sequences 104; and converting said trit sequences into image sequences for transmission from the screen 105 so that the trit sequences may be detected by a receiver and thereby received.

Figure 2:
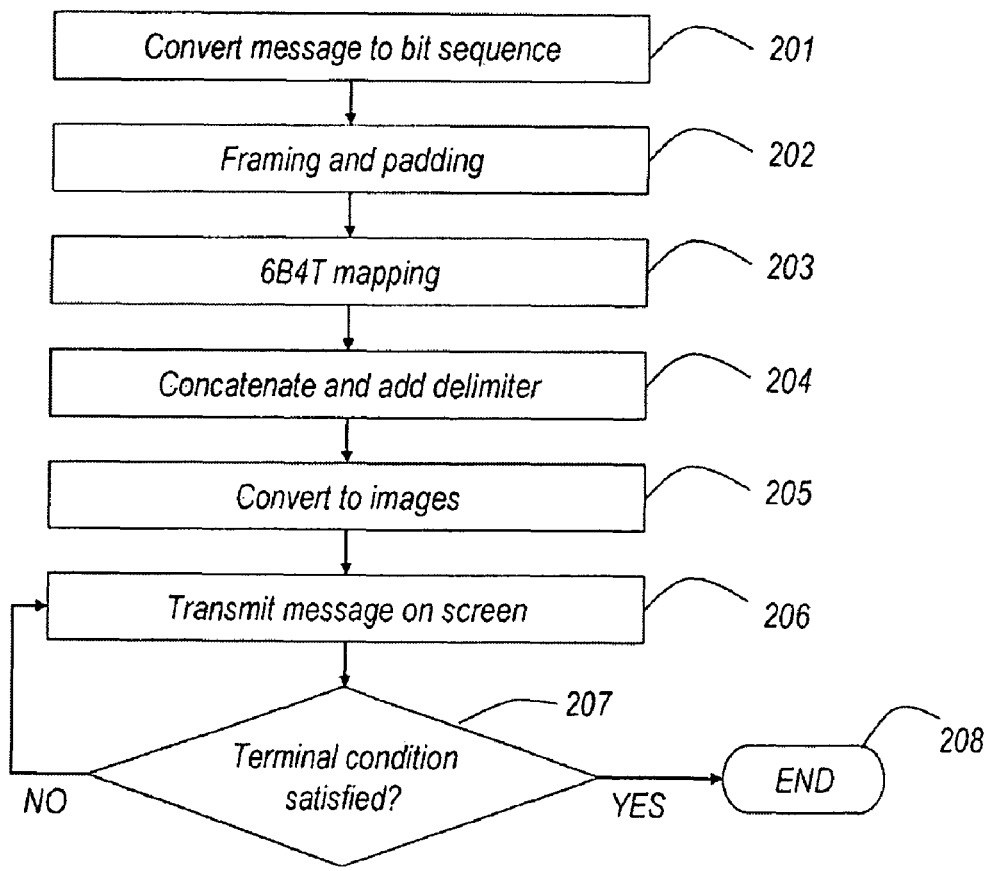
FIG. 2 illustrates a similar method to transmit an alphanumerical message from a screen for reception at a receiver with cyclic repetition.

FIG. 2 illustrates a method to transmit an alphanumerical message from a screen for reception at a receiver with cyclic repetition comprising the steps of converting said alphanumerical message into a first bit sequence 201; dividing said first bit sequence into one or more frames and adding up to 8 padding bits to each of said frames 202; converting each of said frames into a trit sequence, using a 6B4T mapping 203; optionally concatenating and adding a message delimiter to said trit sequences 204; converting said trit sequences into image sequences 205; displaying said image sequences on the screen 206 so that the trit sequences may be detected by a receiver and thereby received; checking if the terminal condition (such as for example reaching a maximum transmission count) is satisfied 207; if the terminal condition is not satisfied, returning to state 206; and if the terminal condition is satisfied, end the process 208.

In general, the computer program according to this invention to transmit an alphanumerical message from a display screen for reception at a receiver, when executed causes the computer to convert the message into a bit sequence, using a prefix-free binary mapping wherein each numeral is represented by a nibble and each other character is represented by a pair of nibbles; divide said first bit sequence into one or more frames, each of which is extended with padding bits so as to have a total number of bits that is a multiple of six; convert each of said frames into a trit sequence, using a mapping whereby ordered sets of six bits are represented by ordered sets of four trits; and convert each of said trit sequences in an image sequence that, when displayed, represents said trit sequences as pixel sets modulated to at least three distinct output levels.

In one embodiment of the present invention, the computer is further caused to concatenate said trit sequences and add a message delimiter prior to their being displayed, said message delimiter consisting of sets of four trits, distinct from the sets of four trits used to represent data. In a particular embodiment of the present invention, the message delimiter is a sequence with optical properties that facilitate clock recovery, such as for example a sequence comprising an alternation of four trits that each have a value that, when transmitted, is represented by maximum luminance of the relevant pixel set, and four trits that each have a value that, when transmitted, is represented by minimum luminance of the relevant pixel set. In another embodiment of the present invention, the message delimiter is a single set of four trits.

In one embodiment of the present invention, the computer is further caused to use an additional optical channel, consisting of a selected set of pixels from the display screen, to signal the symbol rate.

In one embodiment of the present invention, the computer is further caused to encrypt said bit sequence.

In one embodiment of the present invention, the computer is further caused to cyclically display said image sequence without interruption between subsequent transmissions.

In one embodiment of the present invention, cyclic redundancy check information is added to said frames. In another particular embodiment, said frames are delimited by a frame delimiter comprising one or more sets of four trits, distinct from the sets of four trits used to represent data. In a further set of embodiments of the present invention, the trit sequence is further divided into segments, delimited by segment delimiters comprising one or more ordered sets of four trits, distinct from said ordered sets of four trits used to represent ordered sets of six bits.

In one embodiment of the present invention, the prefix-free binary mapping maps every numeral (0-9) onto its binary coded decimal (BCD) equivalent, while mapping all other characters of interest onto some or all of the 96 8-bit combinations that do not have a valid BCD-value as their first nibble. In another embodiment of the present invention, the prefix-free binary mapping maps every numeral onto its binary coded decimal (BCD) equivalent and reserves one nibble for use as a padding sequence, while mapping all other characters of interest onto some or all of 80 8-bit combinations that do not have a valid BCD-value or the padding sequence as their first nibble.

In a general, an apparatus according to this invention for receiving alphanumerical messages from a screen, comprises a plurality of photosensitive elements adapted to detect at least three distinct levels of optical input power for interpretation as a trit sequence, a converter for converting said trit sequence into a bit sequence using a first mapping whereby sets of four trits are mapped onto sets of six bits, another converter for converting said bit sequence into an alphanumerical message using a second mapping, which is a prefix-free binary mapping wherein each numeral is represented by a single nibble and each other characters is represented by a pair of nibbles, and means for communicating said alphanumerical message to a user.

In one embodiment of the present invention, the apparatus further comprises means for detecting and removing a message delimiter in said trit sequence.

In one embodiment of the present invention, the apparatus is further adapted to recover a symbol clock from the message delimiter.

In one embodiment of the present invention, an additional photosensitive element is used to detect a signal representing the symbol rate, and a clock recovery engine is used to derive a symbol clock from said signal.

In one embodiment of the present invention, the apparatus further comprises an engine to decrypt said bit sequence. In a particular embodiment, said engine is a programmed microprocessor. In another particular embodiment, said engine is an Application-Specific Integrated Circuit.

In one embodiment of the present invention, the apparatus is further adapted to detect said trit sequence from a set of identical sequences transmitted without interruption between subsequent transmissions.

In one embodiment of the present invention, the apparatus is further adapted to detect frames in said sequence of trits, and to apply said first mapping to said frames. In a particular embodiment, the apparatus has a memory to store said frames until all frames have been received, and a logical circuit adapted to reorder said frames if necessary. In a particular embodiment, the apparatus is further adapted to verify cyclic redundancy check information present in said frames. In another particular embodiment, said detecting of frames is based on the detection of frame delimiters consisting of one or more sets of four trits, distinct from the sets of four trits used to represent data.

In one embodiment of the present invention, said second mapping maps nibbles onto numerals according to binary coded decimal (BCD) representation, while mapping some or all of the 96 8-bit combinations that do not have a valid BCD-value as their first nibble onto other characters. In another embodiment of the present invention, said second mapping maps nibbles onto numerals according to binary coded decimal (BCD) representation and interprets one nibble as a padding sequence, while mapping some or all of 80 8-bit combinations that do not have a valid BCD-value or the padding sequence as their first nibble onto other characters.

In some embodiments of the invention said means for communicating said alphanumerical message to a user includes a display such as for example a Liquid Crystal Display (LCD). In some other embodiment said means for communicating said alphanumerical message to a user includes audio output means such as for example a loudspeaker, earphones, or means to attach such loudspeaker or headphones such as for example a ⅛" audio socket or an RCA audio socket, to convey information to the user by means of generated sounds. In one embodiment the generated sounds are sequences of tones. In another embodiment the generated sounds consist of synthesized speech. In another embodiment the generated sounds are reproductions of stored sound fragments.

Figure 3:
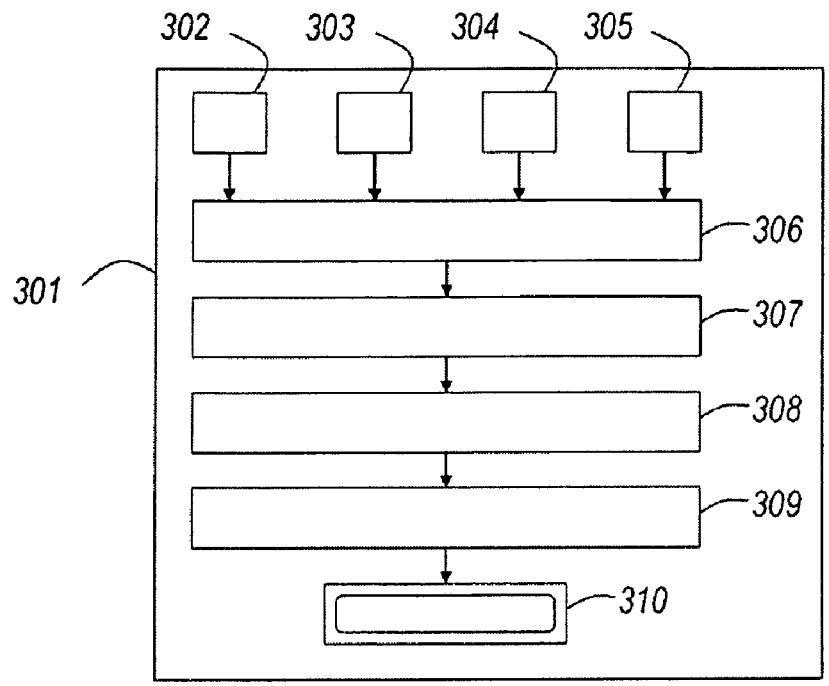
FIG. 3 illustrates an apparatus, comprising photosensitive elements, which detect optical power levels and cooperate with other elements of the apparatus to translate the optical power levels into an alphanumerical message.

FIG. 3 illustrates a receiving apparatus 301, comprising four photosensitive elements 302-305, which detect at least three optical power levels and transfer them as a trit sequence to an optional detector 306 for detecting and removing a message delimiter. The detector 306 (or, if no detector is present, the photosensitive elements 302-305) then transfers said trit sequence to a mapper 307, which converts the trit sequence to a bit sequence, and transfers the bit sequence to an optional decryption engine 308, which passes the decrypted bit sequence on to the a decoder 309. The decoder 309 then reconverts the bit sequence into the alphanumerical message, which can then be shown on the display 310.

Figure 4:
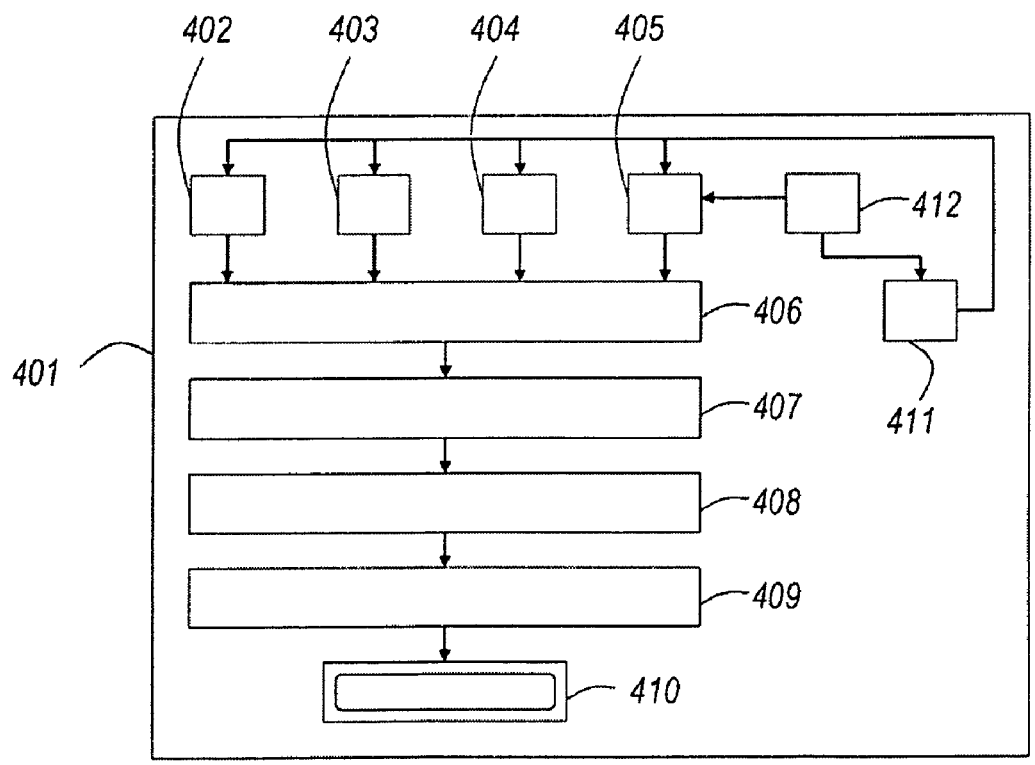
FIG. 4 illustrates an apparatus as in FIG. 3, comprising an additional photosensitive element for capturing a symbol clock signal.

FIG. 4 illustrates a receiving apparatus 401, comprising four photosensitive elements 402-405, which detect at least three optical power levels and transfer them as a trit sequence to an optional detector 406 for detecting and removing a message delimiter. An additional photosensitive element 412 captures a symbol clock signal, and provides this signal to a clock recovery engine 411 which derives symbol clock information from said signal and provides said symbol clock information to the photosensitive elements 402-405. The detector 406 (or, if no detector is present, the photosensitive elements 402-405) transfers said trit sequence to a mapper 407, which converts the trit sequence to a bit sequence, and transfers the bit sequence to an optional decryption engine 408, which passes the decrypted bit sequence on to a decoder 409. The decoder 409 then reconverts the bit sequence into the alphanumerical message, which can then be shown on the display 410.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. A method to transfer an alphanumerical message from a screen to a receiver, comprising
   converting said alphanumerical message into a first bit sequence, using a first mapping wherein each numeral is represented by an ordered set of four bits and other characters are represented by ordered sets of eight bits, the first four bits of said ordered sets of eight bits being distinct from each of said ordered sets of four bits used to represent numerals;
   dividing set first bit sequence into one or more frames, each of which may be extended with padding bits so as to have a total number of bits that is a multiple of six;
   converting each of said frames into a trit sequence, using a second mapping whereby distinct ordered sets of six bits are represented by distinct ordered sets of four trits;
   converting each of said trit sequences into an image sequence that, when displayed, represents said trit sequence as a plurality of pixel sets modulated to at least three distinct output levels.

2. The method of claim 1, additionally comprising concatenating said trit sequences and adding a message delimiter to said concatenated trit sequences, said message delimiter comprising one or more ordered sets of four trits, distinct from said ordered sets of four trits used to represent ordered sets of six bits.

3. The method of claim 2, wherein said message delimiter is a sequence which, when converted into said image sequences, has optical properties that facilitate clock recovery.

4. The method of claim 1, additionally comprising encrypting said first bit sequence.

5. The method of claim 1, wherein an additional pixel set is used to signal the symbol rate.

6. The method of claim 1, additionally comprising cyclically displaying said image sequences without interruption between subsequent transmissions.

7. The method of claim 1, wherein said trit sequences are further divided into a plurality of segments, delimited by segment delimiters comprising one or more ordered sets of four trits, distinct from said ordered sets of four trits used to represent ordered sets of six bits.

8. The method of claim 1, wherein cyclic redundancy check information is added to said frames.

9. The method of claim 1, wherein said trit sequences are delimited by frame delimiters comprising one or more ordered sets of four trits, distinct from said ordered sets of four trits used to represent ordered sets of six bits.

10. The method of claim 1, wherein said first mapping maps numerals onto ordered sets of four bits according to binary coded decimal representation.

11. The method of claim 10, wherein said first mapping reserves one ordered set of four bits for use as a padding sequence.

12. A computer-readable storage medium containing a program for a computer that when executed causes the computer to convert an alphanumerical message into a first bit sequence, using a first mapping wherein each numeral is represented by an ordered set of four bits and other characters are represented by ordered sets of eight bits, the first four bits of said ordered sets of eight bits being distinct from each of said ordered sets of four bits used to represent numerals; divide said first bit sequence into one or more frames, each of which may be extended with padding bits so as to have a total number of bits that is a multiple of six; convert each of said frames into a trit sequence, using a second mapping whereby distinct ordered sets of six bits are represented by distinct ordered sets of four trits; and convert each of said trit sequences into an image sequence that, when displayed, represents said trit sequence as a plurality of pixel sets modulated to at least three distinct output levels.

13. The medium of claim 12, wherein said program further includes concatenating said trit sequences and adding a message delimiter to said concatenated trit sequences prior to said displaying, said message delimiter comprising one or more ordered sets of four trits, distinct from said ordered sets of four trits used to represent ordered sets of six bits.

14. The medium of claim 13, wherein said message delimiter is a sequence with optical properties that facilitate clock recovery.

15. The medium of claim 12, wherein said program further displays a pixel set modulated to signal the symbol rate of said image sequences.

16. The medium of claim 12, wherein said program further encrypts said first bit sequence.

17. The medium of claim 12, wherein said program further cyclically displays said image sequences without interruption between subsequent transmissions.

18. The medium of claim 12, wherein said trit sequences are further divided into a plurality of segments, delimited by segment delimiters comprising one or more ordered sets of four trits, distinct from said ordered sets of four trits used to represent ordered sets of six bits.

19. The medium of claim 12, wherein cyclic redundancy check information is added to each of said frames.

20. The medium of claim 12, wherein said frames are delimited by frame delimiters comprising one or more ordered sets of four trits, distinct from said ordered sets of four trits used to represent ordered sets of six bits.

21. The medium of claim 12, wherein said first mapping maps numerals onto ordered sets of four bits according to binary coded decimal representation.

22. The medium of claim 21, wherein said first mapping reserves one ordered set of four bits for use as a padding sequence.

23. An apparatus for receiving alphanumerical messages from a screen, comprising a plurality of photosensitive elements adapted to detect at least three distinct levels of optical input power for interpretation as a sequence of trits, a mapper for converting said sequence of trits into a sequence of bits using a first mapping whereby distinct ordered sets of four trits are mapped onto distinct ordered sets of six bits, a decoder for converting said sequences of bits into an alphanumerical message using a second mapping wherein each numeral is represented by an ordered set of four bits and other characters are represented by ordered sets of eight bits, the first four bits of said ordered sets of eight bits being distinct from each of said ordered sets of four bits used to represent numerals, and means for communicating said alphanumerical message to a user.

24. The apparatus of claim 23, further comprising a detector for detecting and removing a message delimiter in said sequence of trits.

25. The apparatus of claim 24, wherein set mapper recovers a symbol clock from said message delimiter.

26. The apparatus of claim 23, comprising a photosensitive element for detecting a symbol rate signal and a clock recovery engine for recovering the symbol rate from said symbol rate signal.

27. The apparatus of claim 23, comprising an engine to decrypt said sequence of bits.

28. The apparatus of claim 23, wherein said mapper detects said trit sequence from a set of identical sequences transmitted without interruption between subsequent transmissions.

29. The apparatus of claim 23, wherein said mapper detects and orders frames in said sequence of trits, and applies said first mapping to said frames.

30. The apparatus of claim 29, wherein said mapper verifies cyclic redundancy check information present in said frames.

31. The apparatus of claim 29, wherein said frames are delimited by frame delimiters comprising one or more ordered sets of four trits, distinct from said ordered sets of four trits used to represent ordered sets of six bits.

32. The apparatus of claim 23, wherein said decoder, via said second mapping maps ordered sets of four bits onto numerals according to binary coded decimal representation.

33. The apparatus of claim 32, wherein said second mapping uses one ordered set of four bits as a padding sequence.

* * * * *